W. G. EXTON.
OPTICAL INSTRUMENT.
APPLICATION FILED OCT. 23, 1920.
1,433,877.
Patented Oct. 31, 1922.
2 SHEETS—SHEET 1.
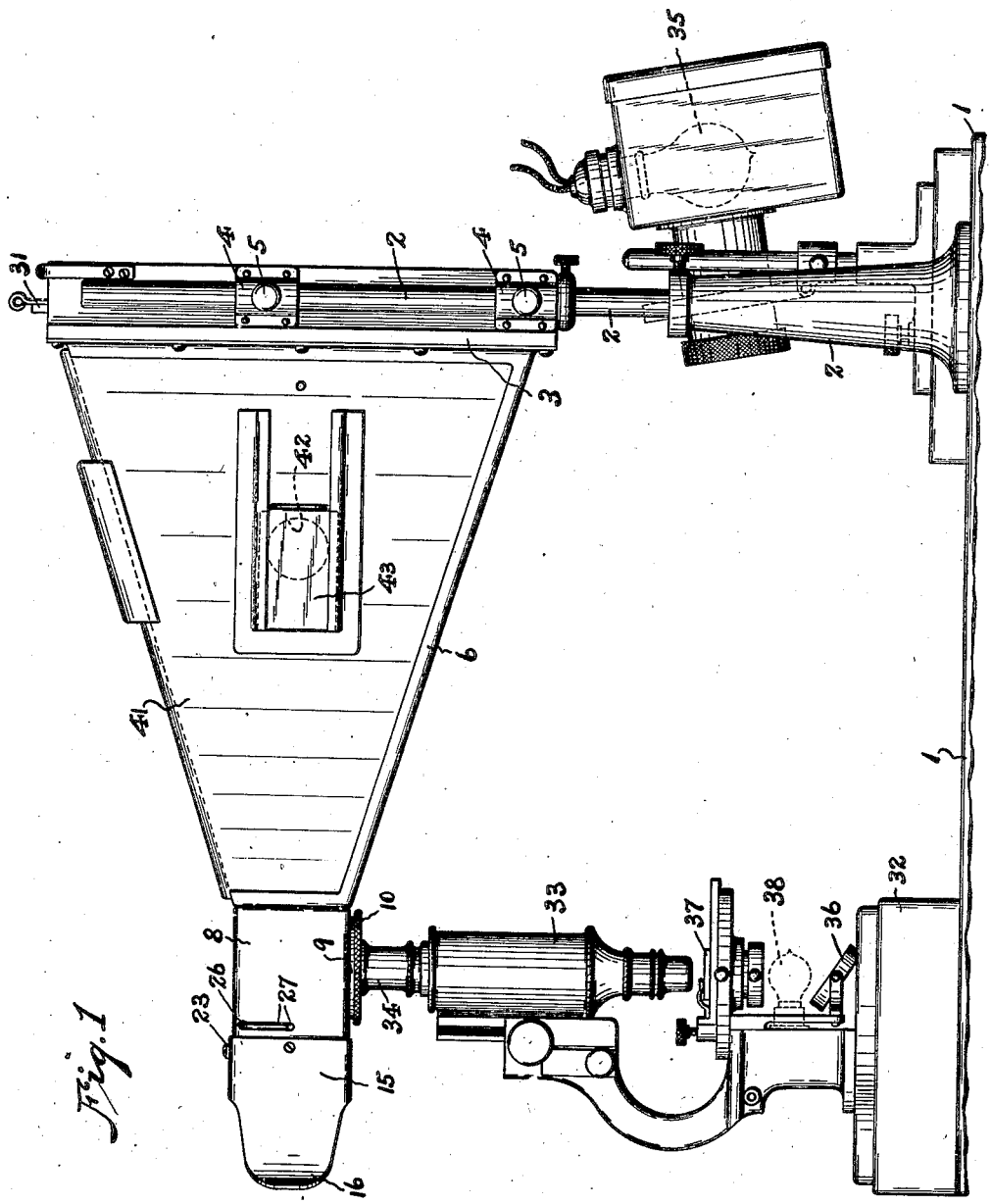
INVENTOR
William G. Exton,
BY
Fraentzel and Richards,
ATTORNEYS

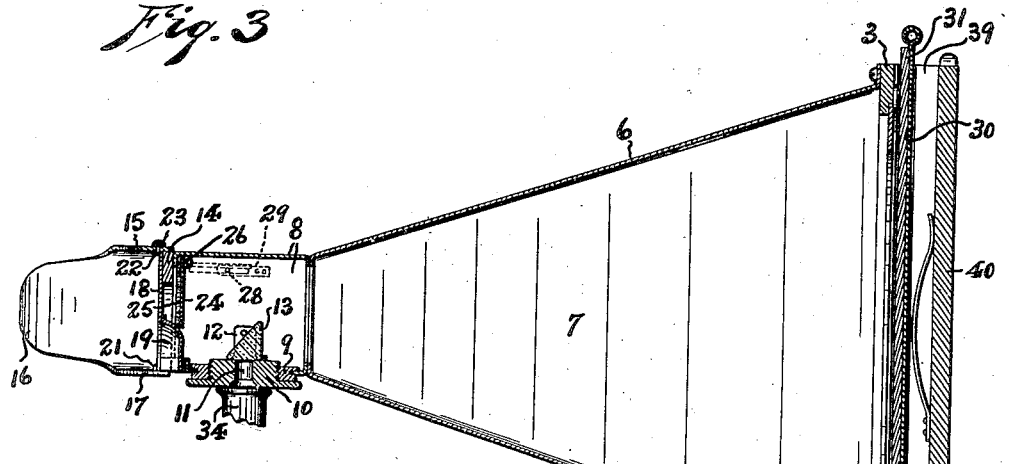
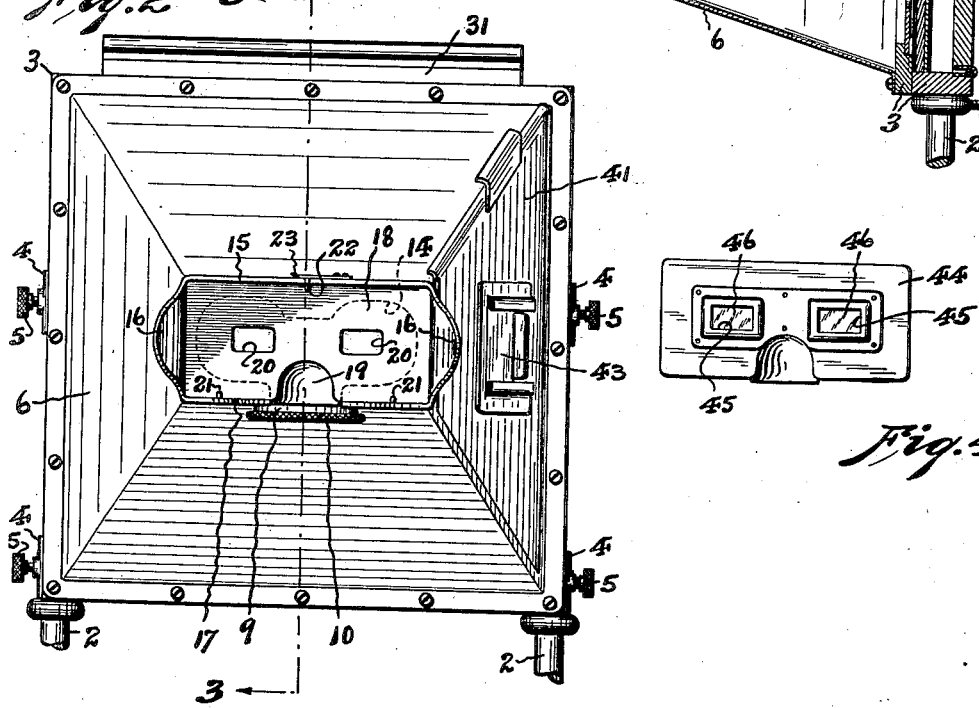
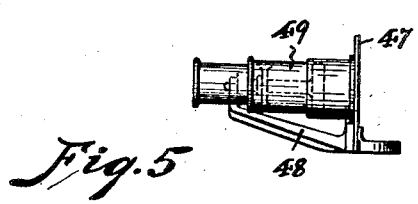

Patented Oct. 31, 1922.

1,433,877

UNITED STATES PATENT OFFICE.

WILLIAM G. EXTON, OF NEW YORK, N. Y.

OPTICAL INSTRUMENT.

Application filed October 23, 1920. Serial No. 418,869.

*To all whom it may concern:*

Be it known that I, WILLIAM G. EXTON, a citizen of the United States, residing at New York, in the county of New York and State of New York, have invented certain new and useful Improvements in Optical Instruments; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in optical instruments; and the invention has reference, more particularly, to a novel construction of projecting device for use with microscopes.

The constant use of the microscope, either for routine laboratory or research purposes, tends to produce physical disabilities resulting from rigidity of position, eye-strain, and retinal irritation, etc., so that many users of such instruments are compelled to give up such work altogether, or to curtail the same, or to continue the work with great physical discomfort and ultimate impaired visual acuity resulting in augmenting refractive and other eye troubles with their sequelæ. In the use of the microscope as ordinarily pursued, such difficulties are due to a number of elements or causes; such as the rigid position of the body and head which is necessary to be maintained in order to have the rays of light, illuminating the object studied, fall correctly on the eye-point; the unnatural strain of monocular vision; the fixation of the eye-balls demanded by axial vision; the fixation of the pupils of the eye by the constant light; derangement of the delicate nervous structure of the retina by reason of the fact that a condensed, converged and intense pencil of light directly plays upon the same; and evils arising from both conscious and unconscious straining and efforts to see better the morphology and structure of the minute objects examined.

The present invention has for its principal object to provide, in combination with a microscope, a novel optical instrument or projectorscope which is adapted to prevent the difficulties presented in the ordinary use of the microscope as above pointed out, and to thereby afford ease, comfort and accuracy in the use of the microscope, and at the same time open new fields of usefulness for the latter while at the same time providing additional practical features which will be subsequently more fully explained. To these ends the present invention provides a specially constructed viewing box, having adjacent to one end a suitable reflecting means such as an appropriately cut total reflecting prism with which the eye-piece of a microscope is alined whereby the microscopic or other optical image is bent conveniently at approximately a right angle so as to be projected upon a screen of appropriate color supported in the opposite end or back of said viewing box, while the forward end of said viewing box is provided with a specially arranged front piece having eye apertures therein, thus permitting examinations of the projected image to be made in any kind of light with a minimum of detrimental effect upon the eyes, and all so arranged and combined that natural and comfortable positions of the body, head and eyes may be assumed in a manner permitting natural binocular vision and avoiding necessity of axial vision. The projection of the image makes for increased magnifications which tend to alleviate straining and conduce to accuracy, while the impact of light on the retina is reduced to the minimum characteristic of reflections. Thus ease, comfort and freedom from eye injury and eye faults are achieved without necessity of changing in any way the customary manipulation of the microscope in use.

Other objects of the present invention, not at this time more particularly enumerated, will be clearly understood from the following detailed description of the same.

With the various objects of the invention in view, the same consists, primarily, in the novel construction of projectorscope hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 1 is a side elevation of the novel construction of projectorscope, for use with microscopes and similar optical instruments, made according to and embodying the principles of the present invention.

Figure 2 is a detail front end elevation of the viewing box; and Figure 3 is a detail longitudinal section of the same, taken on line 3—3 in said Figure 2.

Figure 4 is a front elevation of a modified form of eye-piece for use with the novel projectorscope, the same providing lenses for magnifying, stereoscopic or other effects in connection with the eye apertures thereof.

Figure 5 is a side elevation of another modified construction of eye-piece, having means for supporting in connection with the eye-apertures thereof additional magnifying instruments on the order of the opera or field glass instrument.

Similar characters of reference are employed in all of the hereinabove described views, to indicate corresponding parts.

Referring now to said drawings, the reference character 1 indicates a base or bed member, provided at its rearward end with a pair of laterally spaced standards 2, or other suitably constructed supporting means.

Disposed in supported relation to said standards 2 is a frame member 3 provided on its exterior vertical sides with socket members 4 for the reception of the upper ends of said standards 2, said socket members 4 having lock screws 5 for securing said frame member in desired vertically adjusted position upon said standards. Secured to the forward face of said frame member 3, by any suitable fastening means, is a viewing box 6, consisting of a substantially funnel shaped hollow body having its sides converging toward its forward free end. Said viewing box 6 is preferably made of sheet metal, and may be of any desired cross-sectional shape, but preferably of a four sided polygonal shape. The interior of said viewing box provides a dark chamber 7 from which the light is excluded. Connected with the outer constricted end of said viewing box 6 is a reflector chamber 8, in the bottom or floor of which is secured an internally threaded annular ring or socket piece 9. Threaded into said annular ring or socket piece 9 is a mounting 10 having an aperture 11 extending upwardly therethrough. Arranged upon said mounting 10, in proper relation to said aperture 11, and secured between retaining posts 12, is a reflecting means, preferably in the form of total reflecting prism 13. Secured in connection with the forward end of said reflector chamber 8 is a frame piece 14 to which is secured a forwardly projecting hood 15 having at its sides outwardly curved side members 16. Said hood is provided with an inwardly and centrally indented bottom portion 17 so that the nose of the user may enter therethrough. Said hood 15, with its side members 16 and indented bottom portion 17, provides a properly shaped means with which the user's head may be engaged so as to exclude exterior light from the eyes, when the user gazes into the viewing box 6. Removably arranged within said hood 15, and supported against said frame piece 14, is an eye-piece or plate 18 having at its lower portion a centrally disposed inwardly depressed portion 19 which is alined with the indented bottom portion 17 of said hood to provide space for the user's nose when the head is operatively applied to the hood. Said eye-piece or plate 18 is provided with properly disposed eye apertures 20. The means for removably retaining the eye-piece or plate 18 in place comprises, a pair of fixed retaining pegs 21 between which and said frame piece 14 the lower margin of said eye-piece or plate is engaged, and a movable peg 22 which is supported by a fixed leaf-spring 23 to enter through the upper wall of said hood to engage the upper margin of said eye-piece or plate. In order to prevent dust, dirt or other foreign material from entering through the eye-apertures 20 when the device is not in use, and lodging upon and dimming the transparency of the reflecting prism 13, there is provided a pivoted blind 24 having a felt facing 25. Said blind is supported upon a transverse shaft 26 which is journaled in the side walls of said reflector chamber 8 at its upper forward end. Normally said blind depends from said shaft 26 so as to extend downwardly across the eye-apertures 20. An exterior end of said shaft 26 is provided with a crank handle 27 by means of which the blind may be swung upwardly to the dotted position shown in Figure 3, in which position it does not obstruct the view into the viewing box through the eye-apertures. The blind is held in its raised position by engagement with a movable stop-pin 28 carried on a fixed leaf-spring 29 mounted on an exterior side of said reflector chamber, so that the pin may enter into the reflector chamber to engage and hold up said blind. Said blind, when closed, also serves the additional purpose of preventing light from entering the viewing box chamber 7 through the eye apertures 20, when using the device for photographic purposes in the manner subsequently explained.

The frame member 3 is provided on its inner vertical sides with grooves or channels 30 which serve as guides for holding a removable screen member 31, the screen surface of which is appropriately colored to reflect the optical image thrown thereon.

Connected with the forward end of said base or bed member 1 is a supporting block or pedestal 32 upon which is placed a microscope 33 of any desired construction. The eye-piece 34 of said microscope is alined with the aperture 11 of the reflecting prism mounting 10, so that the optical image obtained through the microscope is transmitted therethrough, and thence through the reflecting prism 13, so as to be projected by the latter through the viewing box chamber 7 upon the screen member 31. Also mounted upon the base or bed member 1 is a suitable light source 35, the same being properly located to direct a concentrated intense light upon the reflecting mirror 36 of the microscope, so that the illuminating light may be passed upwardly through the object slide 37, and thence through the microscope and reflecting prism 13 to produce upon the screen 31 an enlarged projected optical image of the object to be examined. If it is desired direct light may be transmitted through the condenser and object slide and microscope by placing a light source directly beneath the condenser and object slide, so indicated by dotted representation of a lamp 38 shown in Figure 1.

Said frame member 3 is provided with a top opening 39 so that when the screen member 31 is removed, an ordinary photographic plate or paper holder may be supported in the frame and exposed within the viewing box chamber 7 so as to receive the projected optical image directly thereupon, thus providing a very simple and easy method of securing photo-micrographs with unexampled freedom from manipulation, and avoiding the necessity of using any camera or special apparatus.

Said frame member 3 is also provided with a hinged back member 40, which may be opened, when the screen member 31 is removed, to permit exterior projection of the optical image, thus providing all the advantages now offered by special projection apparatus, with far less troublesome manipulation and expense, and in an improved and more convenient form because it permits the operator to sit comfortably and manipulate the object slide of the microscope as one naturally does in making search for a particular part of a specimen, or in other special examination.

In the detail construction of the viewing box 6, I have so arranged the same that one side thereof, to wit the side 41, is removable, so that when removed the optical image projected upon the screen member 31 may be viewed for purposes of making sketches or drawings; thus providing, in a simple manner, the practical advantages of a camera lucida. I also provide, either in the fixed or the removable side of the viewing box 6, a small peep hole 42, normally closed by a slide door 43. This peep-hole is of advantage, since it may be used by a pupil to view the projected optical image upon the screen member 31 while the instructor manipulates the microscope and its object slide and himself views the projected optical image through the eye apertures 20.

I may provide, in place of the eye-piece 18, an eye-piece 44 of the character shown in Figure 4, and having associated with its eye apertures 45 stereoscopic lenses 46, which will serve to give to the operator a stereoscopic image if desired.

I may also provide a substitutable eye-piece 47, of the character shown in Figure 5, and which is provided with a supporting bracket 48 for holding in proper associated relation to the eye apertures of the eye-piece additional magnifiers in the form of an optical instrument 49 similar in type to the ordinary opera or small field glass, and by the use of which enlargements of the optical image upon the screen affording entirely new pictures of the object examined are obtainable, so that the operator may see clearly minute structural details and objects not otherwise visible.

By use of appropriate diaphragms, screens and color screens in combination, in a manner familiar to those skilled in the subject, any desired variation of field or color effect may be easily secured.

From the above detailed description of my invention it will be quite apparent that the same provides a very simple construction of micro-projectorscope possessing many advantages in use other than those already above pointed out.

I am aware that some changes may be made in the arrangements and combinations of the various devices and parts, as well as in the details of the construction of the same, without departing from the scope of my present invention as set forth in the foregoing specification and as defined in the appended claims. Hence, I do not limit my invention to the exact arrangements and combinations of the various devices and parts as described in said specification, nor do I confine myself to the exact details of the construction of the said parts as illustrated in the accompanying drawings.

I claim:—

1. In a device of the kind described, a viewing box having an interior screen member at its rear end, a mounting having an aperture secured in the lower side of said viewing box adjacent to its forward end, a reflecting means supported by said mounting, a hood connected with the forward end of said viewing box, an eye-piece provided with binocular eye-apertures associated with said hood, and means for supporting said viewing box, said reflecting means being adapted to project upon said screen member an optical image transmitted to said reflecting means from an external source.

2. In a device of the kind described, a viewing box having an interior screen member at its rear end, a mounting having an aperture secured in the lower side of said viewing box adjacent to its forward end, a reflecting means supported by said mounting, a hood connected with the forward end of said viewing box, an eye-piece provided with binocular eye-apertures associated with said hood, means for supporting said viewing box, a microscope having its eye-piece alined with the aperture of said mounting, and means for transmitting light through said microscope so that the optical image produced thereby is transmitted to said reflecting means by which it is projected upon said screen member of said viewing box.

3. In a device of the kind described, a viewing box enlarging in cross section toward its rear end, a frame member secured to the rear end of said viewing box, a removable screen-member supported by said frame member, a mounting having an aperture secured in the lower side of said viewing box adjacent to its forward end, a reflecting means supported by said mounting, a hood connected with the forward end of said viewing box, a transverse eye-piece provided with binocular eye-apertures associated with said hood, and means for supporting said viewing box, said reflecting means being adapted to project upon said screen member an optical image transmitted to said reflecting means from an external source.

4. In a device of the kind described, a viewing box enlarging in cross section toward its rear end, a frame member secured to the rear end of said viewing box, a removable screen member supported by said frame member, a mounting having an aperture secured in the lower side of said viewing box adjacent to its forward end, a reflecting means supported by said mounting, a hood connected with the forward end of said viewing box, a transverse eye-piece provided with binocular eye-apertures associated with said hood, means for supporting said viewing box, a microscope having its eye-piece alined with the aperture of said mounting, and means for transmitting light through said miscrope so that the optical image produced thereby is transmitted to said reflecting means by which it is projected upon said screen member of said viewing box.

5. In a device of the kind described, a viewing box enlarging in cross section toward its rear end, a frame member secured to the rear end of said viewing box, a hinged back member connected with said frame member, a removable screen member supported by said frame member, said frame member being adapted to also support a photographic plate holder at will, a mounting having an aperture secured in the lower side of said viewing box adjacent to its forward end, a reflecting means supported by said mounting, a hood connected with the forward end of said viewing box, a removable transverse eye-piece provided with binocular eye-apertures associated with said hood, a pivoted blind for closing said eye-apertures, means for holding said blind in opened position, and means for supporting said viewing box, said reflecting means being adapted to project upon said screen member an optical image transmitted to said reflecting means from an external source.

6. In a device of the kind described, a viewing box enlarging in cross section toward its rear end, a frame member secured to the rear end of said viewing box, a hinged back member connected with said frame member, a removable screen member supported by said frame member, said frame member being adapted to also support a photographic plate holder at will, a mounting having an aperture secured in the lower side of said viewing box adjacent to its forward end, a reflecting means supported by said mounting, a hood connected with the forward end of said viewing box, a removable transverse eye-piece provided with binocular eye-apertures associated with said hood, a pivoted blind for closing said eye apertures, means for holding said blind in opened position, means for supporting said viewing box, a microscope having its eye-piece alined with the aperture of said mounting, and means for transmitting light through said microscope so that the optical image produced thereby is transmitted to said reflecting means by which it is projected upon said screen member of said viewing box.

7. In a device of the kind described, a viewing box having an interior screen member at its rear end, a mounting having an aperture secured in the lower side of said viewing box adjacent to its forward end, a reflecting means supported by said mounting, a hood connected with the forward end of said viewing box, an eye-piece provided with binocular eye-apertures associated with said hood, a side of said viewing box having a peep hole located intermediate said screen member and said reflecting means, a slide cover for said peep hole, and means for supporting said viewing box, said reflecting means being adapted to project upon said screen member an optical image transmitted to said reflecting means from an external source.

8. In a device of the kind described, a viewing box having an interior screen member at its rear end, a mounting having an aperture secured in the lower side of said viewing box adjacent to its forward end, a reflecting means supported by said mounting, a hood connected with the forward end of said viewing box, an eye-piece provided with binocular eye-apertures associated with said hood, a side of said viewing box having a peep hole located intermediate said screen member and said reflecting means, a slide cover for said peep hole, means for supporting said viewing box, a microscope having its eye-piece alined with the aperture of said mounting, and means for transmitting light through said microscope so that the optical image produced thereby is transmitted to said reflecting means by which it is projected upon said screen member of said viewing box.

9. In a device of the kind described, a viewing box having a removable side, a transverse screen member supported at the rear end of said viewing box, a mounting having an aperture secured in the lower side of said viewing box adjacent to its forward end, a reflecting means supported by said mounting, a hood connected with the forward end of said viewing box, an eye-piece provided with binocular eye apertures associated with said hood, and means for supporting said viewing box, said reflecting means being adapted to project upon said screen member an optical image transmitted to said reflecting means from an external source.

10. In a device of the kind described, a viewing box having a removable side, a transverse screen member supported at the rear end of said viewing box, a mounting having an aperture secured in the lower side of said viewing box adjacent to its forward end, a reflecting means supported by said mounting, a hood connected with the forward end of said viewing box, an eye-piece provided with binocular eye apertures associated with said hood, means for supporting said viewing box, a microscope having its eye-piece alined with the aperture of said mounting, and means for transmitting light through said microscope so that the optical image produced thereby is transmitted to said reflecting means by which it is projected upon said screen member of said viewing box.

11. In a device of the kind described, a viewing box having a removable side, a transverse screen member supported at the rear end of said viewing box, a mounting having an aperture secured in the lower side of said viewing box adjacent to its forward end, a reflecting means supported by said mounting, a hood connected with the forward end of said viewing box, an eye-piece provided with binocular eye apertures associated with said hood, a pivoted blind for closing said eye-apertures, means for holding said blind in opened position, and means for supporting said viewing box, said reflecting means being adapted to project upon said screen member an optical image transmitted to said reflecting means from an external source.

12. In a device of the kind described, a viewing box having a removable side, a transverse screen member supported at the rear end of said viewing box, a mounting having an aperture secured in the lower side of said viewing box adjacent to its forward end, a reflecting means supported by said mounting, a hood connected with the forward end of said viewing box, an eye-piece provided with binocular eye apertures associated with said hood, a pivoted blind for closing said eye apertures, means for holding said blind in opened position, means for supporting said viewing box, a microscope having its eye-piece alined with the aperture of said mounting, and means for transmitting light through said microscope so that the optical image produced thereby is transmitted to said reflecting means by which it is projected upon said screen member of said viewing box.

13. In a device of the kind described, a viewing box, means for supporting said viewing box, a frame member at the rear end of said viewing box, a hinged back member connected with said frame member for closing the rear side of the latter, said frame member being adapted to hold a screen, photographic plate or paper holder or the like, a mounting having an aperture secured in the lower side of said viewing box adjacent to its forward end, a reflecting means supported by said mounting, a hood connected with the forward end of said viewing box, a transverse eye-piece provided with binocular eye apertures associated with said hood, means for closing said eye apertures, and means for supporting said viewing box.

14. In a device of the kind described, a viewing box, means for supporting said viewing box, a frame member at the rear end of said viewing box, a hinged back member connected with said frame member for closing the rear side of the latter, said frame member being adapted to hold a screen, photographic plate or paper holder or the like, a mounting having an aperture secured in the lower side of said viewing box adjacent to its forward end, a reflecting means supported by said mounting, a hood connected with the forward end of said viewing box, a transverse eye-piece provided with binocular eye apertures associated with said hood, means for closing said eye apertures, means for supporting said viewing box, a microscope having its eye-piece alined with the aperture of said mounting, and means for transmitting light through said microscope so that the optical image produced thereby is transmitted to said reflecting means for projection through the interior of said viewing box.

15. In a device of the kind described, a viewing box having a screen at one end and binocular eye-apertures at the opposite end, a reflecting means mounted in the lower wall of said viewing box adjacent to said eye apertures, said reflecting means being adapted to project upon said screen an optical image transmitted therethrough, additional optical lens devices, and means for associating the latter with said eye apertures.

16. In a device of the kind described, a viewing box having a screen at one end and binocular eye-apertures at the opposite end, a reflecting means mounted in the lower wall of said viewing box adjacent to said eye apertures, said reflecting means being adapted to project upon said screen an optical image transmitted therethrough, additional optical lens devices, means for associating the latter with said eye apertures, a microscope beneath said viewing box having its eye-piece alined with said reflecting means, and means for transmitting light to and through said microscope.

17. In a device of the kind described, a viewing box having a screen at one end and binocular eye-apertures at the opposite end, one wall of said viewing box having an opening intermediate the screen and eye portions, and a reflecting means registered with said opening adapted to project upon said screen an optical image transmitted to said reflecting means from an external source, said reflecting means being so positioned that the path of projection between the source of said image and said reflecting means does not cross the path of reflection between said screen and said eye-apertures.

In testimony, that I claim the invention set forth above I have hereunto set my hand this 5th day of October, 1920.

WILLIAM G. EXTON.

Witnesses:
GEORGE D. RICHARDS,
HARRY VERUET.